United States Patent [19]
Cords et al.

[11] Patent Number: 5,735,124
[45] Date of Patent: *Apr. 7, 1998

[54] INTERNALLY BOOSTED MASTER CYLINDER

[75] Inventors: Frederick W. Cords, Le Sueur; David E. Frye, North Mankato, both of Minn.

[73] Assignee: Commercial Intertech Corp., Youngstown, Ohio

[*] Notice: The term of this patent shall not extend beyond the expiration date of Pat. No. 5,655,429.

[21] Appl. No.: 681,865

[22] Filed: Jul. 29, 1996

Related U.S. Application Data

[63] Continuation-in-part of Ser. No. 568,628, Dec. 7, 1995.
[51] Int. Cl.$^6$ ................................................ B60T 13/12
[52] U.S. Cl. ........................ 60/548; 60/553; 60/557; 60/560; 91/434
[58] Field of Search .................... 60/548, 552, 553, 60/555, 557, 560, 563, 564, 574; 91/431, 434

[56] References Cited

U.S. PATENT DOCUMENTS

| 2,964,909 | 12/1960 | Garrison | 60/548 |
| 4,126,996 | 11/1978 | Leiber | 60/593 |
| 4,280,395 | 7/1981 | Shaw | 91/431 |
| 4,641,894 | 2/1987 | Belart | 60/560 |
| 5,031,968 | 7/1991 | Takata | 60/582 |

*Primary Examiner*—F. Daniel Lopez
*Attorney, Agent, or Firm*—Faegre & Benson

[57] ABSTRACT

A brake system for use in connection with a vehicle including a hydraulic internally boosted master cylinder, a hydraulic pump, and hydraulic brakes wherein the master cylinder controls hydraulic fluid pressure to the brakes and has a primary or sensing piston, a modulator stem, and a secondary pistons, with the sensing piston responsive to a mechanical input force to urge the secondary piston forwards increasing the hydraulic fluid pressure applied to the brakes. In a second embodiment, the internally boosted master cylinder further includes a tertiary piston movable by hydraulic pressure between retracted and extended positions and biased toward the retracted position by a tertiary piston return spring. The tertiary piston controls hydraulic pressure applied to one or more brakes independent of the brakes controlled by the secondary piston.

19 Claims, 3 Drawing Sheets

INTERNALLY BOOSTED MASTER CYLINDER

CROSS REFERENCE TO RELATED APPLICATION

This is a Continuation-In-Part of U.S. patent application Ser. No. 08/568,628, filed Dec. 7, 1995.

FIELD OF THE INVENTION

The present invention is in the field of hydraulic brake systems and more specifically master cylinders for use in such systems.

DESCRIPTION OF RELATED ART

Hydraulic brake systems are well known and in widespread use in cars, trucks, and other vehicles. Large, heavy vehicles and vehicles engaged in moving heavy loads require hydraulic brake systems that reliably deliver large braking forces. Current systems, however, are very complex. They often contain redundant systems for reliability in case one should fail. They also often include redundant parts, including dual brake actuator valves, dual accumulator charging valves, and dual accumulators, in case one part should fail. A large amount of tubing, hoses, and plumbing is required to incorporate these redundant systems and parts into current brake systems. There remains, therefore a continuing need for efficient, reliable hydraulic brake systems and master cylinders for use therewith.

SUMMARY OF THE INVENTION

The present invention is a hydraulic brake system and a hydraulic master cylinder for use in the system. The overall system includes a hydraulic pump, hydraulic brakes, and the hydraulic master cylinder for controlling the flow of hydraulic fluid to the brakes. One embodiment of the hydraulic master cylinder includes a housing, a sensing or primary control piston, a modulator stem or piston, a secondary piston, and a chamber for hydraulic fluid. The master cylinder housing further includes a port in fluid communication with a hydraulic pump. A brake port, a pressure switch port, and a replenishing port in the housing are in fluid communication with the chamber. The sensing piston is movable between extended and retracted positions in response to external mechanical input forces applied by a vehicle operator. The modulator stem controls a modulating fluid flow in response to the external mechanical input forces. The secondary piston is located in the chamber and is movable between extended and retracted positions. The secondary piston includes a through bore in fluid communication with the chamber and the modulator stem for controlling the fluid pressure to be applied to the brakes. A secondary piston spring biases the secondary piston to the retracted position. A modulator spring biases the modulator stem a predetermined distance away from the sensing piston in the retracted position.

In another embodiment of the hydraulic system a tertiary piston moves between retracted and actuated positions in the housing. The tertiary piston includes a first end in contact with the secondary control piston return spring and in fluid communication with the brake actuating chamber adjacent the secondary control piston. The tertiary piston further includes a second end forming a portion of a tertiary piston brake actuating chamber. The second end of the tertiary piston is preferably configured for engagement with a tertiary piston return spring which biases the tertiary piston to a retracted position when pressure in the brake actuating chamber is relieved. The remainder of the tertiary brake actuating chamber is formed by the housing.

DETAILED DESCRIPTION

Figure 1:
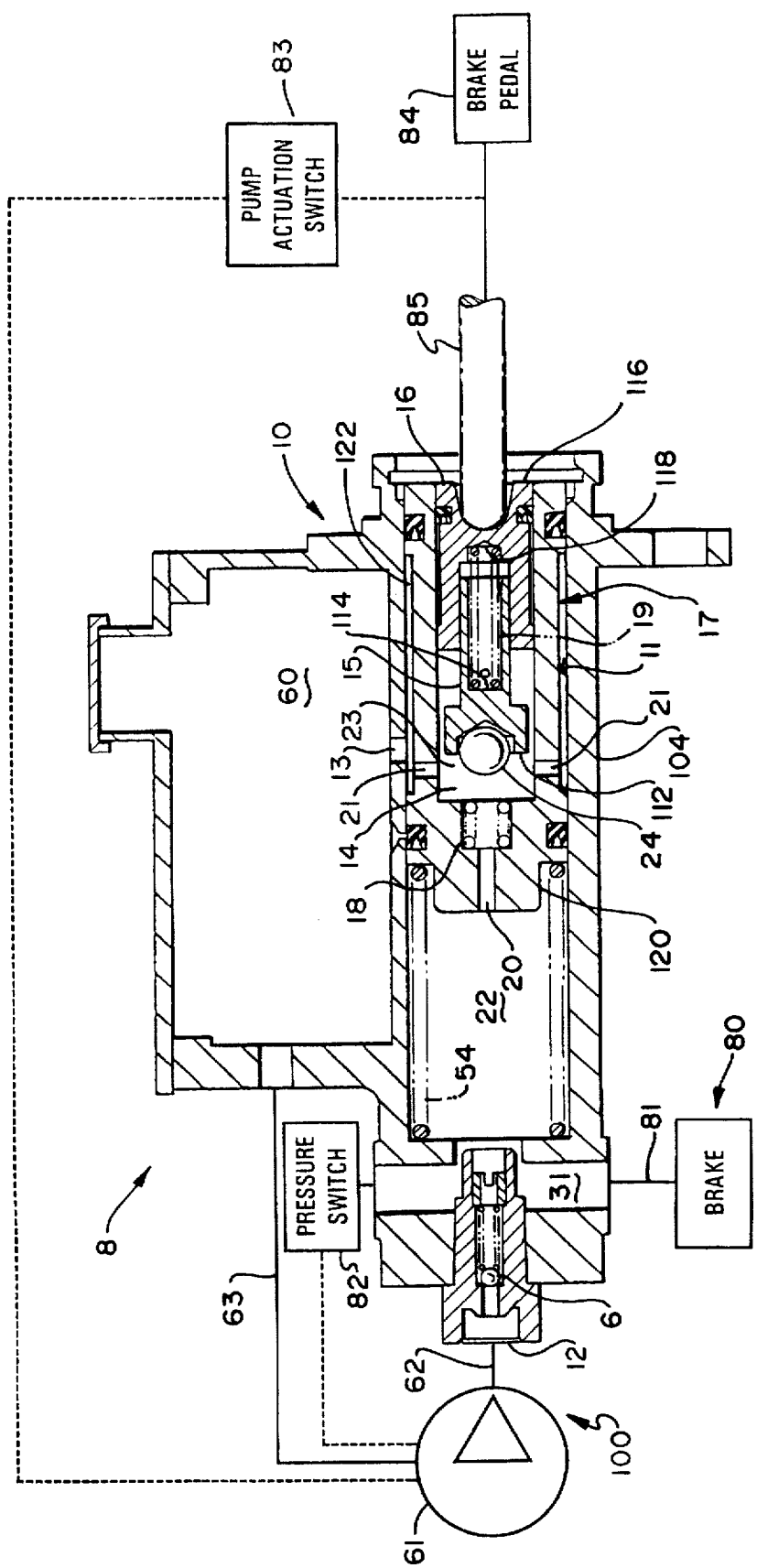
FIG. 1 is a schematic diagram of a hydraulic brake system in accordance with a first embodiment of the present invention, including a cross-sectional view of the internally boosted master cylinder, with parts shown in a retracted position.

A hydraulic brake system 8 including an internally boosted master cylinder 10 in accordance with the present invention is illustrated generally in FIG. 1. Master cylinder 10 is coupled to a hydraulic system 100, and controls the flow of hydraulic fluid to vehicle brakes 80 in response to actuation of a vehicle brake pedal 84 acting through a linkage or pushrod 85. Brakes 80 can be of any conventional or otherwise known design. The hydraulic system 100 includes master cylinder 10 and a hydraulic pump 61.

Master cylinder 10 includes a housing 104 which forms a hydraulic fluid reservoir 60, a modulator valve chamber 11, and a brake actuating chamber 22. Master cylinder 10 also includes a primary control or sensing piston 16, a modulator piston or modulator stem 15, and a secondary control or brake actuating piston 17. A modulator piston valve 14 is positioned in modulator valve chamber 11, and modulates fluid flow of hydraulic fluid from the hydraulic system 100 in a manner described below. Modulator piston valve 14 is comprised of a first piston actuating member or modulator piston 15, a second piston actuating member or primary control piston 16, and secondary control piston 17. The secondary control piston 17 is capable of moving freely in the modulator valve chamber 11, and includes a head portion 120 with a cylindrical sleeve portion 122. The sleeve portion 122 forms a chamber 23 in which modulator piston 15 and primary control piston 16 are mounted for reciprocatable motion between retracted and extended positions. The modulator piston 15 and the primary control piston 16 are biased to retracted positions by a secondary piston spring 18 and a modulator piston valve spring 19, respectively. A passage 20 extends through the head portion 120 of the secondary control piston 17. A pair of secondary control piston ports 21 extend radially through the sleeve portion 122 of brake actuating piston 17. A fluid flow path therefore extends between inlet port 12 and reservoir return port 13.

The flow of hydraulic fluid from the hydraulic system 100 into and out of the modulator valve chamber 11 occurs through the inlet port 12 and the reservoir return port 13. Inlet port 12 is fluidly coupled to pump 61 through a hydraulic fluid line 62. A check valve 6 is connected in series with inlet port 12. Pump 61 is connected to receive hydraulic fluid from fluid reservoir 60 through hydraulic fluid line 63. Head portion 120 of brake actuating piston 17 together with a portion of housing 104 form a brake actuating chamber 22. A return spring 54 urges piston 17 toward the retracted position shown in FIG. 1. Chamber 22, passage 20 of the secondary control piston 17, and chamber 23 of the sleeve portion 122 of the secondary control piston 17 fluidly couple port 12 to port 13 through port 21 in the secondary control piston 17.

The modulator piston valve 14 controls the flow of hydraulic fluid between port 12 and port 13 and increases the hydraulic pressure in brake actuating chamber 22 in response to increases in external input force applied via linkage or pushrod 85. Modulator piston 15 has first and second opposite ends 112 and 114, respectively, and is shown biased to a retracted position in FIG. 1, but is moveable toward an extended position (shown in FIG. 2) while remaining within sleeve portion 122 of piston 17. A valve ball 24 is mounted on the first end 112 of the modulator piston 15. Primary control piston 16 has an input end 116 and a reaction end 118, shown biased toward a retracted position in FIG. 1, and moveable toward an extended position (shown in FIG. 2) while remaining within sleeve portion 122 of piston 17. Modulator piston valve spring 19 is mounted between the second end 114 of modulator piston 15 and the reaction end 118 of primary control or sensing piston 16.

Figure 2:
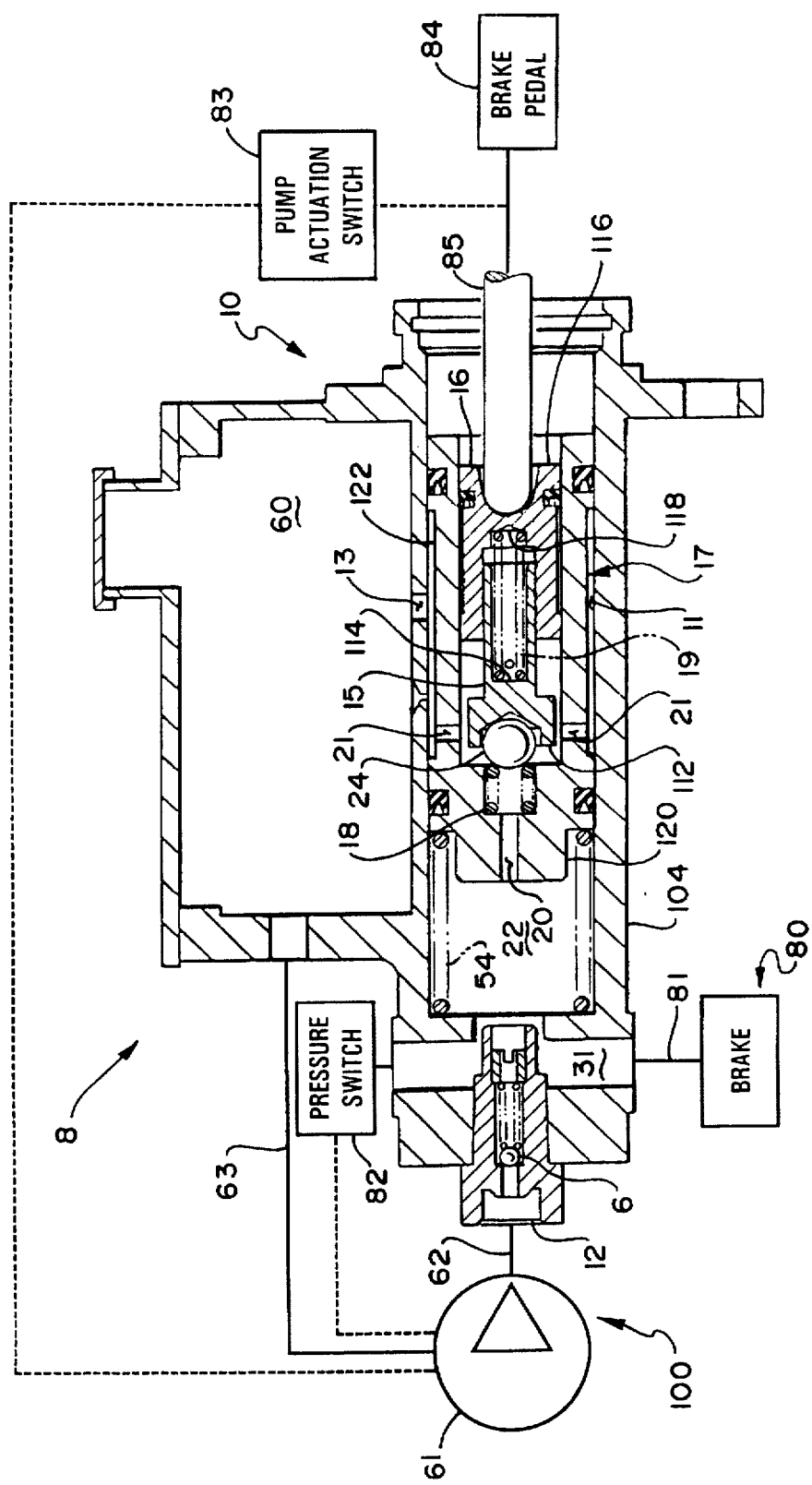
FIG. 2 is a schematic diagram of the internally boosted master cylinder shown in FIG. 1, illustrating parts advanced to an extended position.

Referring now more particularly to FIG. 2, external mechanical input through the brake pedal 84 causes the primary control piston 16 and the modulator piston 15 to move toward the extended position from the retracted position, thereby urging the modulator piston valve 14 towards a closed condition when valve ball 24 is urged toward passage 20 of secondary control piston 17 and secondary piston spring 18. In this manner, the flow of hydraulic fluid through the modulator valve chamber 11 is restricted, since passage 20, chamber 22, and inlet port 12 are fluidly isolated from chamber 23 and port 13 by the action of ball 24 closing against head portion 120 of piston 17. By "isolated" it is to be understood that conditions of flow restriction as well as flow cutoff are to be included. This flow restriction generates amplified fluid forces as fluid pressure builds in chamber 22. The increased hydraulic pressure in chamber 22 is communicated to brakes 80 via a brake port 31 and a hydraulic line 81.

The operation of the hydraulic system 8 when the components of master cylinder 10 are in the retracted position (i.e. when the brakes 80 are not actuated) can be described with reference to FIG. 1. When the pump 61 is turned on either through operator input closing the brake switch 83 or hydraulic pressure falling below the predetermined level and closing the pressure switch 82, hydraulic fluid flows from the reservoir 60 through port 12 and into the modulator valve chamber 11 and chamber 22. With the primary control piston 16 and the modulator piston 15 in the retracted position, the modulator piston valve 14 remains in the open state, and hydraulic fluid flows into chamber 23. The fluid then flows through secondary control piston port 21 and port 13 and returns to the reservoir 60.

As shown in FIG. 2, operator input through brake pedal 84 forces the components of master cylinder 10 toward the extended position, thereby actuating the brakes 80. Operator input through the brake pedal 84 closes the pump actuation or brake switch 83, which turns the pump 61 on and starts the flow of fluid in the modulator valve chamber 11. The operator input force moves the primary control piston 16 toward the extended position; which in turn forces the modulator piston valve spring 19 to contract and mechanically couples the primary control piston 16 and the modulator piston 15. The modulator piston valve spring 19 exerts a force on the modulator piston 15, forcing it toward the extended position, thereby closing the modulator piston valve 14 by engaging the valve ball 24 with the secondary piston spring 18. This fluidly isolates chamber 22, and reduces the flow of fluid in the modulator valve chamber 11. With the modulator piston valve 14 restricted, the hydraulic fluid remains in chamber 22 and builds up pressure in the modulator valve chamber 11 between the input end 51 of the primary input piston 50 and the head 120 of the secondary control piston 17.

Should the electrical system on the vehicle not function properly, including those portions of hydraulic system 100, thereby causing pump 61 to become inoperative, the brake system can still operate. Operator input through brake pedal 84 will move the primary control piston 16 and the modulator piston 15 into the extended position and engage the valve ball 24 and secondary piston spring 18, thereby mechanically coupling the components. With no fluid flow from the pump 61, however, no pressure will build up in chamber 22, and the contact between valve ball 24 and the secondary piston spring 18 will exert a force on the secondary control piston 17 and force it toward the extended position.

Figure 3:
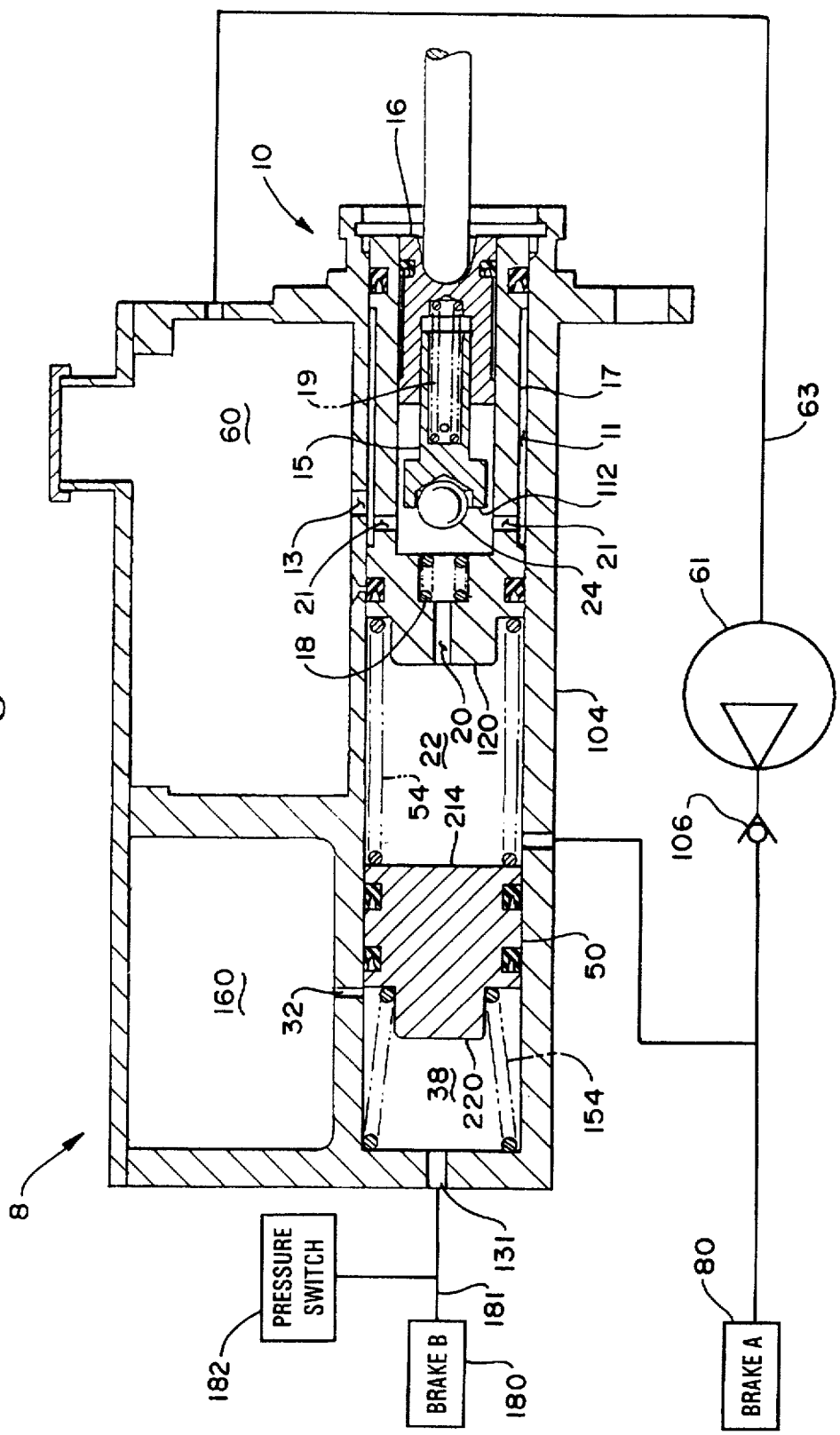
FIG. 3 is a schematic illustration of a second embodiment of the hydraulic brake system of the present invention with parts shown in a retracted position.

Referring now to FIG. 3, another embodiment may be seen. In this embodiment of the hydraulic system, a tertiary piston 50 moves between extended and retracted positions in the housing 104. The tertiary piston 50 includes a first end 214 in fluid communication with the chamber 22 and a second end 220 in fluid communication with a tertiary piston brake actuating chamber 38 formed by piston 50 and housing 104. The second end 220 of the tertiary piston 50 is configured for engagement with a tertiary piston return spring 154 which biases the tertiary piston 50 to a retracted position when pressure in the brake actuating chamber 22 is relieved. The tertiary brake actuating chamber 38 is in fluid communication with an inlet port 32 and an outlet port 131. Inlet port 32 fluidly connects an auxiliary reservoir 160 with chamber 38, while outlet port 131 is fluidly coupled via a fluid line 181 to one or more brakes 180 independent of brakes 80. A pressure switch 182 may be connected to line 181 (or directly to housing 104) to detect the pressure in the tertiary piston brake actuating chamber 38. As shown in FIG. 3, with parts in a retracted condition or state, piston 50 allows fluid communication from auxiliary reservoir 160 to chamber 38. When an operator input applies pressure to the primary control piston 16, pressure will build in chamber 22, urging piston 50 towards chamber 38, increasing the fluid pressure in chamber 38 and line 181 actuating brakes 180. This will occur regardless of whether pump 61 is operating normally or has stopped. In this embodiment, a check valve 106 will block reverse fluid flow in the event of brake system actuation with pump 61 stopped. With pump 61 operating, it is to be understood that the actuation of brake B 180 by tertiary piston 50 will be power-assisted because of the increased pressure present in chamber 22 during that mode of operation. Thus it can be seen that both brake A 80 and brake B 180 will be actuated regardless of the condition of pump 61 (i.e., with or without power assist).

Although the present invention has been described with reference to preferred embodiments, those skilled in the art will recognize that changes can be made in form and detail without departing from the spirit and scope of the invention.

What is claimed is:

1. Apparatus for providing internal boosting within a master cylinder for a land vehicle brake system comprising:
   a) a housing having:
      i) a hydraulic fluid reservoir, and
      ii) a bore having a port fluidly connected to the fluid reservoir;
   b) a brake actuating piston received in the bore and slidingly sealed thereto and having a head portion connected to a sleeve portion surrounding a recess the head portion having a bore therethrough and forming a brake actuating chamber in the bore of the housing when the brake actuating piston is received therein;

c) a sensing piston received in and slidingly sealed to the recess of the brake actuating piston and having a first end exposed exteriorly of the housing for receiving motion from an operator driven actuator and having a second end distal of the first end;

d) a modulating stem received between the sensing piston and the brake actuating piston and having a valve member facing the bore in the head portion of the brake actuating piston;

e) a spring located in and projecting slightly beyond the bore in the head portion of the brake actuating piston for urging the valve member away from the bore; and f) a hydraulic pump fluidly connected between the fluid reservoir and the bore of the housing to pressurize the chamber to a relatively high pressure when the pump is energized such that the master cylinder is internally boosted when the pump is energized.

2. The apparatus of claim 1 wherein the valve member comprises a ball carried by the modulating stem.

3. The apparatus of claim 1 further comprises a modulator spring located between the modulator stem and the sensing piston to urge the stem away from the sensing piston and allowing the stem to compress the modulator spring and modulate the fluid pressure in the chamber by allowing the valve member to move away from the bore in the head portion of the brake actuating piston.

4. The apparatus of claim 1 further comprising a check valve located between the pump and the chamber to permit flow from the pump to the chamber and to block flow from the chamber to the pump.

5. Apparatus for a land vehicle brake system having internal boosting within a master cylinder to provide power assist to at least one vehicle brake comprising:

a) a housing having:
  i) a hydraulic fluid reservoir, and
  ii) a bore having a port fluidly connected to the fluid reservoir;

b) at least one brake actuating piston received in the bore and slidingly sealed thereto and having a head portion connected to a sleeve portion surrounding a recess the head portion having a bore therethrough and forming a brake actuating chamber in the bore of the housing when the brake actuating piston is received therein;

c) a sensing piston received in and slidingly sealed to the recess of the brake actuating piston and having a first end exposed exteriorly of the housing for receiving motion from an operator-driven actuator and having a second end distal of the first end;

d) a modulating stem received between the sensing piston and the brake actuating piston and having a valve member facing the bore in the head portion of the brake actuating piston;

e) a spring located in and projecting slightly beyond the bore in the head portion of the brake actuating piston for urging the valve member away from the bore;

f) a hydraulic pump fluidly connected between the fluid reservoir and the bore of the housing to pressurize the chamber to a relatively high pressure when the pump is energized such that the master cylinder is internally boosted when the pump is energized; and g) at least one vehicle brake fluidly connected to the chamber for selectively actuating the brake when the motion is received from the operator-driven actuator.

6. Apparatus for providing internal boosting within a master cylinder for a land vehicle brake system having two isolated sets of brakes, the apparatus comprising:

a) a housing having:
  i) a first and a second hydraulic fluid reservoir, and
  ii) a bore ending in a wall having a port therethrough;

b) a first brake actuating piston received in the bore and slidingly sealed thereto and having a head portion connected to a sleeve portion surrounding a recess, the head portion having a bore therethrough and forming a first brake actuating chamber in the bore of the housing when the brake actuating piston is received therein;

c) a sensing piston received in and slidingly sealed to the recess of the first brake actuating piston and having a first end exposed exteriorly of the housing for receiving motion from an operator driven actuator and having a second end distal of the first end;

d) a modulating stem received between the sensing piston and the first brake actuating piston and having a valve member facing the bore in the head portion of the first brake actuating piston;

e) a spring located in and projecting slightly beyond the bore in the head portion of the brake actuating piston for urging the valve member away from the bore;

f) a hydraulic pump fluidly connected between the first fluid reservoir and a port in fluid communication with the bore of the housing to pressurize the first brake actuating chamber to a relatively high pressure when the pump is energized such that the master cylinder is internally boosted when the pump is energized; and g) a second brake actuating piston received in the bore and slidingly sealed thereto and having a first end adjacent the first brake actuating chamber and a second end forming a second brake actuating chamber in the bore of the housing adjacent the wall having a port therethrough when the second brake actuating piston is received therein.

7. The apparatus of claim 6 further comprising g) a port providing fluid communication between the second fluid reservoir and the second brake actuating chamber.

8. The apparatus of claim 6 further comprising:

h) a first brake actuating piston return spring located between the first and second brake actuating pistons.

9. The apparatus of claim 8 further comprising:

i) a second brake actuating piston return spring located between the second brake actuating piston and the wall.

10. A method of modulating an internal boost pressure within a master cylinder for a land vehicle brake system comprising the steps of:

a) turning on a hydraulic pump in response to a drop in the pressure within a brake actuating chamber to pressurize the brake actuating chamber within the master cylinder and formed by a secondary piston and a housing of the master cylinder;

b) modulating the pressure within the brake actuating chamber by axially moving a sensing piston received within the secondary piston, such that the sensing piston urges a modulator piston having a valve member towards an opening in the secondary piston to restrict fluid flow through a bore in the secondary piston; and c) supplying the modulated fluid pressure from the brake actuating chamber to at least one vehicle brake for retarding motion of the vehicle.

11. The method of claim 10 wherein step a) further comprises turning on the hydraulic pump in response to motion from an operator-driven actuator.

12. The method of claim 10 wherein step b) further comprises limiting the pressure in the brake actuating chamber by driving the modulating piston through a spring located between the sensing piston and the modulating piston.

13. The method of claim 10 further comprising the additional step of:

d) urging the secondary piston to a retracted position by a secondary piston return spring.

14. The method of claim 13 wherein the secondary return spring of step d) acts against the housing.

15. The method of claim 10 wherein the brake actuating chamber comprises a first brake actuating chamber and the method further comprises the additional step of:

d) applying the pressure from the first brake actuating chamber to a tertiary piston in the master cylinder to urge the tertiary piston against fluid in a second brake actuating chamber to provide a modulated pressure to a second vehicle brake independent of the vehicle brake actuated by the first brake actuating chamber.

16. The method of claim 15 further comprising the additional step of:

e) urging the tertiary piston to a retracted position by a tertiary piston return spring.

17. The method of claim 16 wherein the tertiary return spring of step e) acts against the housing.

18. The method of claim 15 comprising the additional step of:

e) urging the secondary piston to a retracted position by a secondary piston return spring.

19. The method of claim 18 wherein the secondary return spring of step e) acts against the tertiary piston.

* * * * *